Sept. 12, 1967 D. A. PAY ET AL 3,341,654
TELEVISION SIGNAL CORRECTING CIRCUIT ARRANGEMENTS
Filed March 26, 1964
3 Sheets-Sheet 1

INVENTORS
Donald Alexander Pay
and
John Harwood Deveson
BY Baldwin & Wight
ATTORNEYS

TELEVISION SIGNAL CORRECTING CIRCUIT ARRANGEMENTS

Filed March 26, 1964

INVENTORS
Donald Alexander Pay
and
John Harwood Deveson
BY Baldwin & Wight
ATTORNEYS Sept. 12, 1967 D. A. PAY ET AL 3,341,654

TELEVISION SIGNAL CORRECTING CIRCUIT ARRANGEMENTS

Filed March 26, 1964

3 Sheets-Sheet 3

INVENTORS
Donald Alexander Pay
John Harwood Deveson
BY Baldwin & Wight
ATTORNEYS United States Patent Office 3,341,654

Patented Sept. 12, 1967

3,341,654

TELEVISION SIGNAL CORRECTING CIRCUIT ARRANGEMENTS

Donald Alexander Pay and John Harwood Deveson, Essex, England, assignors to The Marconi Company Limited, London, England, a British company Filed Mar. 26, 1964, Ser. No. 354,964
Claims priority, application Great Britain, Apr. 1, 1963, 12,750/63
6 Claims. (Cl. 178—7.1)

This invention relates to television signal correcting circuit arrangements, or, as they are usually termed, so-called "gamma correcting circuits" such as are commonly employed in television practice. Gamma correcting circuits are in common use and have, of course, controllable non-linear correction characteristics. The most normally adopted correction characteristic is one composed of a series of substantially linear regions of different slopes—generally 3 such regions—corresponding to different regions of constant gain, the region of greatest gain being for video signals at and near "black," the region of least gain being for video signals at and near "white" and the region of intermediate gain extending between the end of the first region and the beginning of the last. Such a correction characteristic will, therefore, have two fairly sharp changes of gain (slop of characteristic), one at the junction of the first and second regions and the other at the junction of the second and third regions. The number of regions of different gain is not necessarily three—it can be any number from two upwards—but three is common practice. The points of change of gain are often termed and will herein be referred to as "onset" points. Normal practice is to provide for independent adjustment of the relative gains over the different individual regions and for adjustment of the individual points of onset.

The invention is illustrated in and explained in connection with the accompanying drawings.

Figure 1:
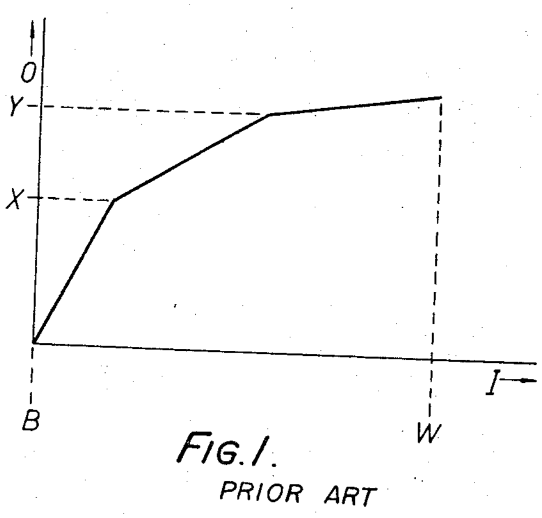
FIG. 1. PRIOR ART

FIG. 1 represents graphically the non-linear correction characteristic of a typically known three-region gamma correcting circuit. The curve of FIG. 1 connects output amplitudes O (ordinates) with input amplitudes I (abscissae). B corresponds to "black" and W to "white." The onset points are at X and Y. The region of intermediate gain is from X to Y, the region of greatest gain being on the "black" side of X and the region of least gain being on the "white" side of Y. It is usual to provide two independent pre-set controls for individually adjusting the individual positions, between "black" and "white," of the onset points X and Y and two more independent pre-set controls for individually adjusting the slopes of the regions of intermediate and greatest gains.

It will be seen that with a known arrangement adjustable in the known manner above described, variation of the setting of any one of the pre-set controls will be accompanied by a change in the "black" to "white" amplitude at the output. Accordingly it is necessary to re-adjust the overall amplitude before the effect of such a variation of setting can be properly assessed. This is a considerable nuisance, making adjustments of the pre-set controls to secure best results difficult and tedious in achievement. The present invention seeks to overcome this defect.

According to this invention the correction characteristic (input, abscissae-output, ordinates) of a gamma correcting circuit said characteristic consisting of a plurality of successive regions adjoining one another at one or more onset points at which the slope of the characteristic changes relatively sharply, is derived by combining a predetermined primary characteristic extending substantially from "black" to "white" with at least one subsidiary characteristic which also extends substantially from "black" to "white" but which consists of two portions having slopes of opposite sign and which adjoin at an adjustable point corresponding to an adjustable value of "grey," the first of said portions commencing at and the second portions ending at substantially the same ordinate value whereby adjustment of said adjustable value of "grey" adjusts the position of an onset point in the combined characteristic.

Preferably the pre-determined primary characteristic is a substantially linear characteristic of positive substantially constant slope and the portions of the subsidiary characteristic are also substantially linear and of substantially constant slope, the first being of positive slope and the second being of negative slope.

Preferably also the slope of the first portion of the subsidiary characteristic is arranged to remain constant as the point at which said portions adjoin is adjusted, the slope of the second portion alone changing with such adjustment.

According to a feature of this invention a gamma correcting circuit comprises means for producing from input video signals a main signal whose amplitude ratio to that of the input signal remains constant from "black" to "white"; means for producing from said input signals at least one correcting signal the amplitude of which increases substantially linearly at a pre-determined rate from zero to an adjustable maximum from "black" to an adjustable value of "grey" intermediate between "black" and "white" thereafter decreasing substantially linearly to zero for an input signal increasing from said adjustable value of grey to "white"; and means for adding an adjustable proportion of said correcting signal to said main signal.

Preferably the means for producing each correction signal comprise a double diode clipper circuit which includes two oppositely sensed series diodes and is connected between a point at which the main signal appears and a point at which appears an adjustable proportion of a signal having substantially the same amplitude as said main signal and which is of zero amplitude for peak white, the correction signal being taken from between the series diodes.

Figure 3:
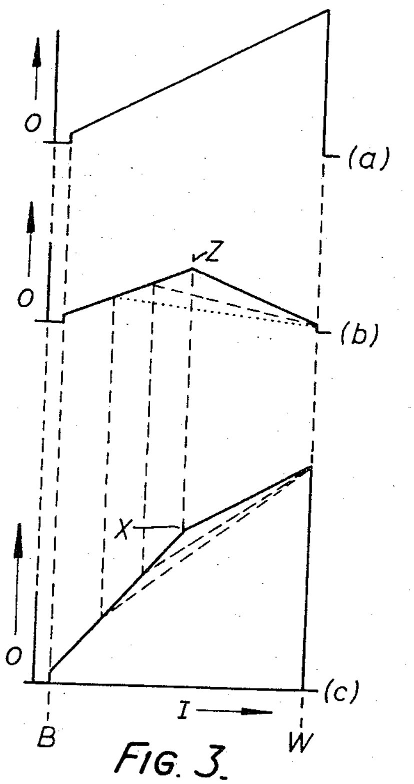
Figure 2:
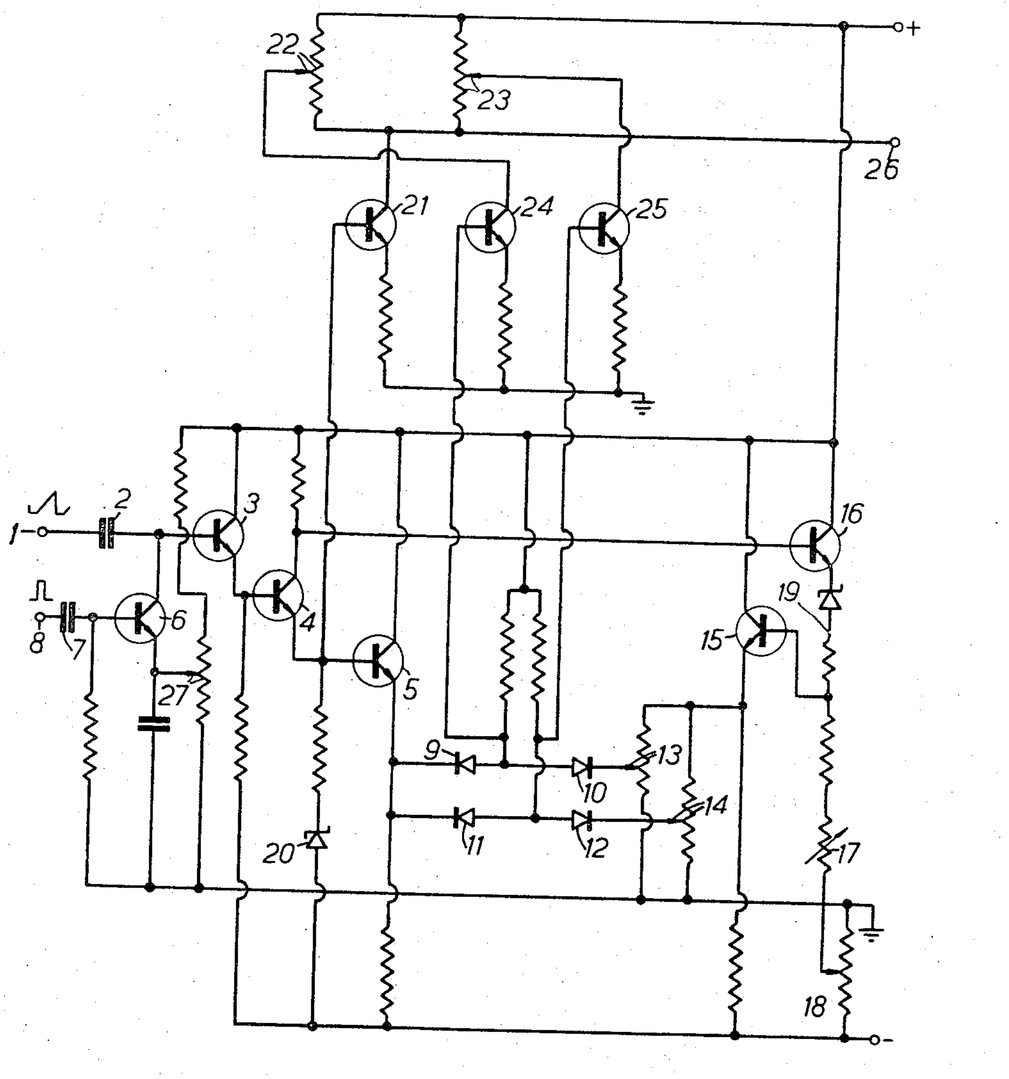
Figure 4:
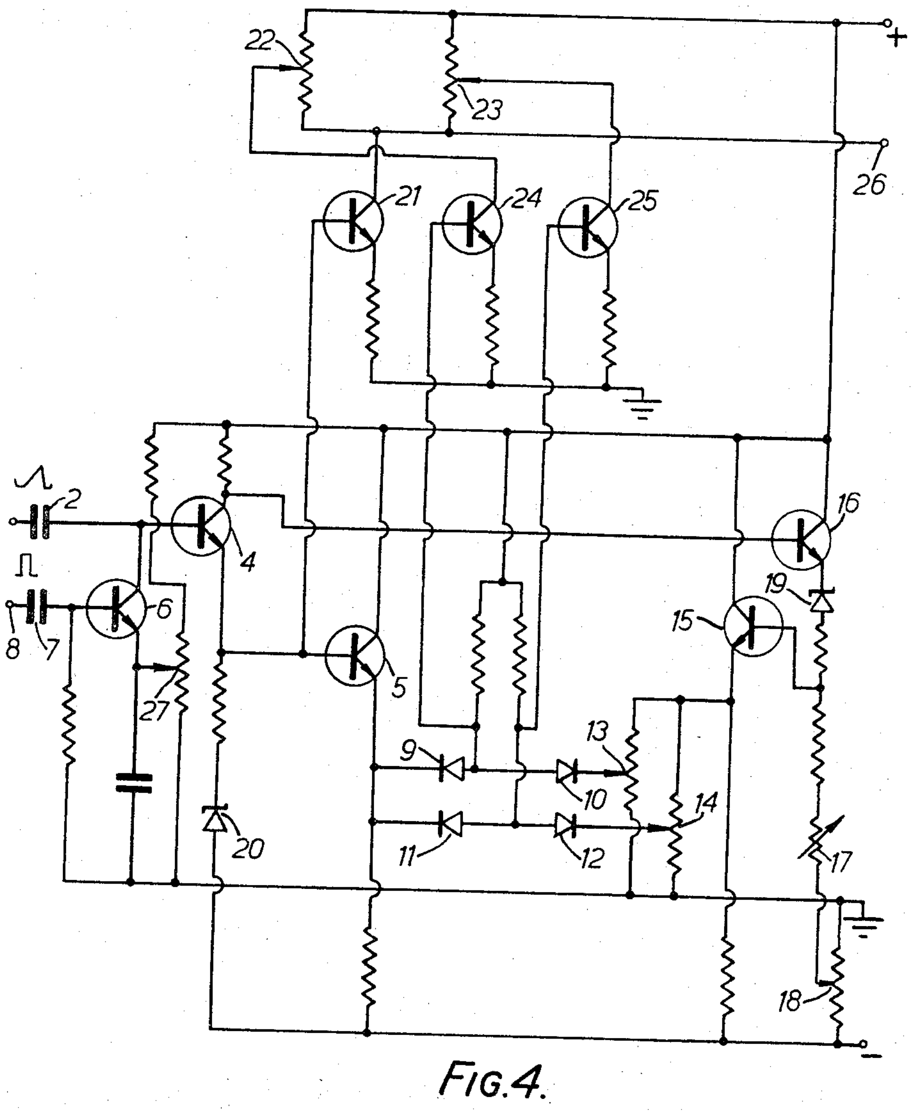

FIG. 2 is a diagram of one embodiment of the invention; FIG. 3 is an explanatory graphical figure; and FIG. 4 is a diagram of a preferred and simpler embodiment of the invention. Like references denote like parts in FIGURES 2 and 4.

Referring to FIG. 2 the input signal, exemplified as a positive going saw tooth is applied at the input terminal 1 through a condenser 2 to the base of a transistor 3 where it is clamped and passed on via a transistor 4 to the base of a transistor 5. The signal at the base of transistor 3 is clamped by a known clamping circuit including a transistor 6 to the base of which clamping pulses are applied through condenser 7 from a pulse input terminal 8 against which a clamping pulse is represented conventionally. A potentiometer 27 provides adjustment of the potential on the emitter of transistor 6. The clamping is so adjusted that "black" level at the emitter of transistor 5 is zero volts.

Two double diode clipper circuits the one including series diodes 9 and 10 and the other including series diodes 11 and 12, sensed as shown are connected between the emitter of transistor 5 and the sliders of potentiometers 13 and 14 respectively, these potentiometers having their resistances connected between the emitter of a further transistor 15 and earth.

The collector of transistor 4 is connected to the base of another transistor 16 the emitter of which is connected to the base of transistor 15 through a Zener diode 19 and a series resistance as shown and is also connected through said diode said series resistance and a circuit including an adjutable resistance 17 to the slider of a potentiometer 18 the resistance of which is connected between the negative supply terminal and earth.

The video signal available at the emitter of transistor 4, which is connected to the negative supply terminal through a circuit including a Zener diode 20, is applied to the base of a transistor 21 the collector of which is connected to the positive supply terminal through the parallel connected resistances of two potentiometers 22, 23. The sliders of these potentiometers are fed from the collectors of two transistors 24, 25 the bases of which are connected, the one to the junction point of diodes 9 and 10 and the other to the junction point of diodes 11 and 12. The emitters of transistors 21, 24 and 25 are returned to earth through suitable resistances as shown. Gamma corrected signals are taken off at terminal 26 from the collector of transistor 21.

The adjustable resistance 17 and the slider of potentiometer 18 are adjusted to make the signal at the emitter of transistor 15 equal in amplitude to that at the emitter of transistor 5 and also to be zero volts for signals corresponding to peak "white." In the diode clipper circuit including diodes 9 and 10, the diode whose cathode terminal is the more negative will conduct. (Similarly in the clipper circuit including diodes 11 and 12 the diode with the more negative cathode terminal will conduct.) Accordingly the signals appearing at the junction of diodes 9 and 10 will be in accordance with a characteristic as shown by line *b* of FIG. 3, i.e. a characteristic in which the amplitude at the said junction point rises linearly from zero with increase of amplitude of the signal at the emitter of transistor 5 from "black" level towards "white" until a certain turn-over level is reached after which the amplitude falls away linearly to zero at peak "white." The turn-over point Z which corresponds to some value of "grey" is adjustable by adjusting the slider of the potentiometer 13 which provides adjustment of turnover level from zero to 50% of peak "white." The full line part of line *b* of FIG. 3 shows the characteristic when adjustment of potentiometer 13 is made to bring the turn-over point to 50% of peak "white." The broken and dotted lines of line *b* of FIG. 3 show the results obtained for two other adjustments of potentiometer 13. It will be seen that the rising part of the characteristic is of the same slope for all positions of adjustment of potentiometer 13 and that the overall length of the characteristic remains unchanged for all said positions, rising from zero at "black" to the turn-over point and then returning to zero at "white." Adjustment of the position between "black" and "white" of the turn-over point produces therefore alteration of the slope of the falling part of the characteristic and therefore adjustment of the relation between the gain over the falling part of the characteristic to the gain over the rising part thereof.

The effective characteristic as respects signals at the emitter of transistor 4 is a simple linear characteristic as shown by line *a* of FIG. 3. These two characteristics are in effect combined by the transistors 21 and 24 in conjunction with the potentiometer 22 since the collector of transistor 21 is connected to the positive supply terminal through the resistance of the said potentiometer and the junction point of diodes 9 and 10 is connected to the base of transistor 24 the collector of which is connected to the slider of said potentiometer 22. Accordingly ignoring for the moment the effect of the second clipping circuit (diodes 11 and 12) with the associated transistor 25 and potentiometer 23, the effective characteristic at the output terminal 26 will be a summation resultant of the characteristics of lines *a* and *b* of FIG. 3 and will be a two-region characteristic with a first region B to X of one slope and a second region X to W of lesser slope, adjoining at an onset point X. Adjustment of the potentiometer 22 adjusts the proportion of correcting signal from the junction point of diodes 9 and 10 which is added to the main signal from the emitter of transistor 4.

As will now already have been appreciated the circuit actually shown in FIG. 2 provides a three-region characteristic because of the production of a second correcting signal at the junction point of diodes 11 and 12, this correcting signal being in accordance with a characteristic like that of line *b* of FIG. 3 with a turn-over point which is adjustable by adjustment of potentiometer 14. This second correcting signal is also added to the main signal by transistor 25 in conjunction with potentiometer 23, the adjustment of which determines the proportion of second correcting signal added. The overall characteristic obtained at the output terminal 26 will therefore be a three-region characteristic which is a summation resultant of the main signal characteristic (line *a* of FIG. 3), the first correction signal characteristic (line *b* of FIG. 3) and the second correction signal characteristic (not shown) which will be of the same nature as that of the first and with its turn-over point independently adjustable by potentiometer 14. This overall characteristic will have two onset points, one between the first and second regions and adjustable by potentiometer 13 and between the second and third regions and adjustable potentiometer 14. The slope of the first region remains constant as potentiometer 13 is adjusted but such adjustment varies both the position of the first onset point and the slope of the second region. Similarly adjustment of potentiometer 14 varies both the position of the second onset point and the slope of the third region. Since potentiometers 22 and 23 vary the proportions of correcting signals added, adjustments thereof vary both the positions of the onset points and the relative gains as between the three regions. Although, for convenience of description, it has been assumed in the immediately preceding description that potentiometer 13 is adjusted to adjust the position of the first onset point and potentiometer 14 is adjusted to adjust the position of the second it will be obvious that the adjustments need not be made in this particular manner, for the signal from the junction point of diodes 9 and 10 can be used as the second correcting signal and that from the junction point of diodes 11 and 12 may be used as the first.

FIG. 4 shows a simplified variant of the circuit of FIG. 2 differing from the circuit of FIG. 2 principally by the omission of the transistor 3 of FIG. 2 which, it has been found, can be eliminated in practice. FIG. 4 is largely self-explanatory from the figure itself since the same references denote the same parts in FIGS. 2 and 4. As will be apparent, in FIG. 4 the input signal at terminal 1 is applied directly through condensor 2 to the base of transistor 4 and is clamped at said base by the action of the clamping circuit including the transistor 6.

We claim:

1. A gamma correcting circuit arrangement comprising means for producing from input video signals a main signal whose amplitude ratio to that of the input signal remains constant from "black" to "white"; means for producing from said input signals at least one correcting signal the amplitude of which increases substantially linearly at a pre-determined fixed rate from zero to an adjustable maximum from "black" to an adjustable value of "grey" intermediate between "black" and "white" thereafter decreasing substantially linearly to zero for an input signal increasing from said adjustable value of grey to "white"; and means for adding said correcting signal to said main signal.

2. A gamma correcting circuit arrangement comprising a first circuit means having a linear voltage response characteristic of substantially constant slope, second circuit means having a voltage response characteristic comprised of two portions of substantially constant slope but of opposite sign, and means for combining the output of said first and second circuit means, each of the voltage response characteristics extending substantially from black to white, the voltage response characteristic of said second circuit means starting and finishing at substantially the same input voltage value and said second circuit means having adjustment means for adjusting the point at which the two portions join, said point corresponding to an adjustable input voltage value of grey, said gamma correcting circuit providing, for the same input signal fed to the input of each circuit means, a voltage response characteristic consisting of a plurality of successive regions, adjacent regions adjoining one another at an onset point, at which point the slope of the combined characteristic changes relatively sharply, the position of said onset point in the combined characteristic being adjustable by changing the adjustable value of grey of said second circuit means.

3. A circuit arrangement as claimed in claim 2 wherein at least one additional circuit means is included, said additional circuit means being substantially similar to said second circuit means, and said means for combining combines the output of said additional circuit means with the output of said first and second circuit means to produce a plurality of onset points in the over-all voltage response characteristic.

4. A circuit arrangement as claimed in claim 2 wherein said first circuit means has a linear voltage response characteristic of positive slope and said second circuit means has a voltage response characteristic wherein the first portion of the response characteristic is of positive slope and the second portion is of negative slope.

5. A circuit arrangement as claimed in claim 2 wherein said adjusting means adjusts the slope of one of said two portions, while the slope of the remaining portion remains constant.

6. A circuit arrangement as claimed in claim 2 wherein the means for combining the output includes second adjustment means for adjusting the amplitude of the output from said second circuit means prior to said combining of outputs.

References Cited

UNITED STATES PATENTS

| | | | |
|---|---|---|---|
| 2,509,987 | 5/1950 | Newman | 178—6 |
| 2,552,588 | 5/1951 | Reeves | 315—26 |
| 2,612,630 | 9/1952 | Greenleaf | 328 143 |
| 2,692,333 | 10/1954 | Holmes | 178—7.1 |
| 2,708,717 | 5/1955 | Holmes | 328—156 |

JOHN W. CALDWELL, *Acting Primary Examiner.*

J. A. ORSINO, *Assistant Examiner.*